JOHN A. TERRELL, OF BLOOMFIELD, KENTUCKY, ASSIGNOR TO HIMSELF AND C. A. TERRELL.

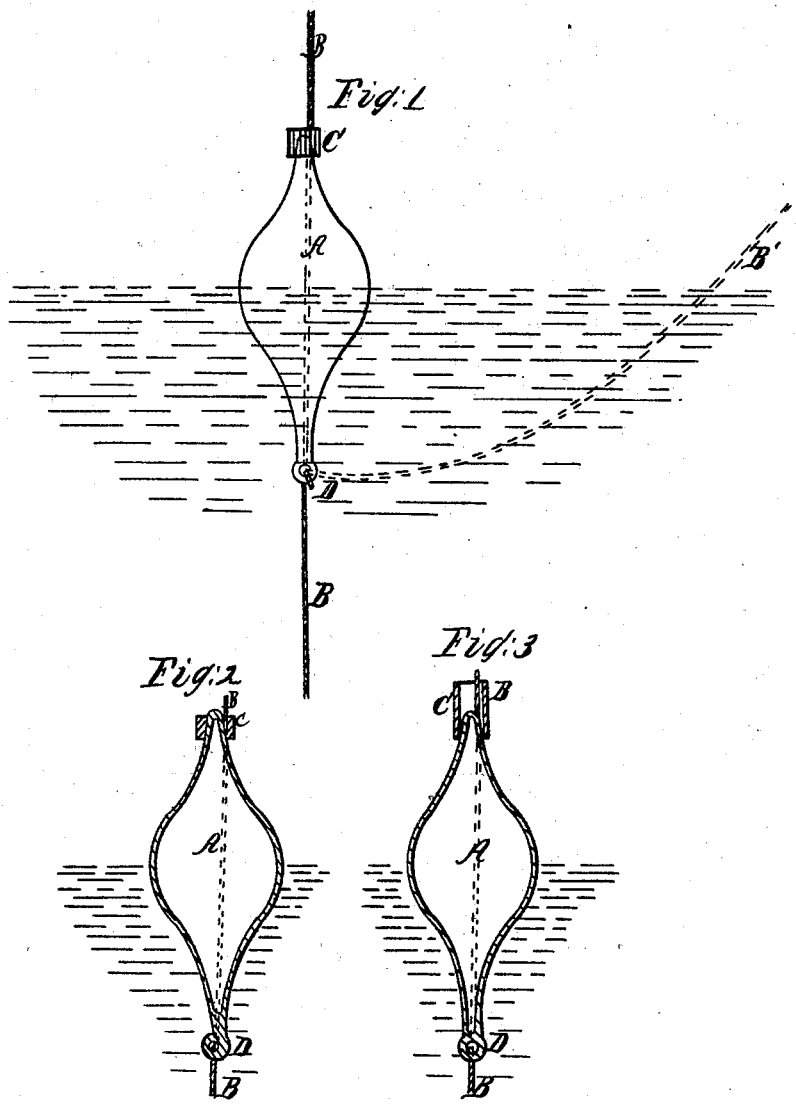

*Letters Patent No. 86,609, dated February 2, 1869.*

IMPROVEMENT IN FLOATS FOR ANGLERS.

The Schedule referred to in these Letters Patent and making part of the same.

*To all whom it may concern:*

Be it known that I, JOHN A. TERRELL, of Bloomfield, in the county of Nelson, and State of Kentucky, have invented a new and useful Improvement in Floats for Lines Used in Angling; and I do hereby declare that the following is a full, clear, and exact description of the same, reference being had to the annexed drawing, making part of this specification, in which—

Figure 1 is a side elevation;

Figure 2 is a vertical section; and

Figure 3 is also a vertical section.

The same letters in all the figures are used to indicate identical parts.

My improvement relates to such floats as are used for buoying lines used in angling; and My invention consists in constructing such floats of glass, made hollow, and either transparent, or so colored as to assimilate to the color of the water in which they are to be used.

Floats cannot be advantageously used in very clear water in angling for very shy fish, such as trout, bass, &c., because, when they seize the bait and begin to move off with it, before swallowing it, they are liable to be alarmed by an opaque cork, or other float, following them through the water, and so abandon the bait without getting the hook into their mouths. To obviate this, I propose to use floats of the ordinary form, but made of glass, either colored or tinged to assimilate to the color of the water in streams where they are to be used. These floats being transparent, are less liable to be observed by and so alarm the fish.

The float A is blown to about the form shown in the drawings, or to any other convenient or ordinary form.

It has a point at the upper end, round and regular in form, resembling the upper stem of the angler's ordinary cork float.

The line B is confined to the upper stem by an elastic collar of India rubber or quill, embracing the line, and compressing it against the stem of the cork, so as to hold it in place.

A loop or eye is formed in the lower end of the float, as shown at D. This may be done by either making the float with a slim stem, which, on being heated, may be bent to form a loop, as shown in fig. 2, or an eye may be formed in an enlargement at the end of the stem, as shown in fig. 3.

The line B is carried downward from this loop or eye, through which it passes.

Instead of confining the line to the top of the float, it may be secured to the lower end of the float, and carried off to one side, as shown in fig. 1, at B'.

The glass must have within it a sufficient air-chamber to give it buoyancy, and at the same time the walls should be thick enough to fit it for ordinary use.

What I claim as my invention, and desire to secure by Letters Patent, is—

As a new article of manufacture, a float for sustaining the line in angling, made of glass, substantially as and for the purpose set forth.

In testimony whereof, I have signed my name to this specification, in the presence of two subscribing witnesses.

JOHN A. TERRELL.

Witnesses:
T. H. MILES,
WM. A. TERRELL.